Patented Mar. 26, 1935

1,995,932

UNITED STATES PATENT OFFICE 1,995,932

WATER - INSOLUBLE MONO - AZO - DYE-STUFFS AND FIBER DYED THEREWITH

Leopold Laska and Arthur Zitscher, Offenbach-on-the-Main, Ernst Fischer, Frankfort-on-the-Main, and Wilhelm Lamberz, Leverkusen-Wiesdorf, Germany, assignors to General Aniline Works, Inc., New York, N. Y., a corporation of Delaware No Drawing. Application August 25, 1933, Serial No. 686,850. In Germany September 2, 1932

10 Claims. (Cl. 260—95)

The present invention relates to water-insoluble mono-azo-dyestuffs and to fiber dyed therewith; more particularly it relates to dyestuffs of the following general formula:

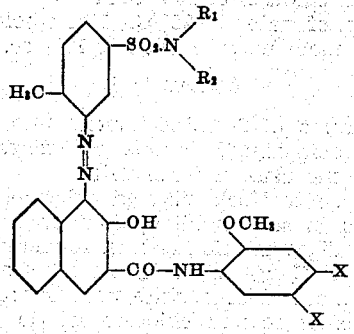

wherein one X stands for chlorine and the other X for methoxy, $R_1$ means an alkyl or aralkyl radical and $R_2$ an alkyl, aryl, aralkyl or a completely hydrogenated hydro-aromatic radical.

We have found that valuable red-mono-azo-dyestuffs are obtainable by coupling the diazo-compounds of the bases of the following general formula:

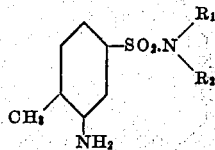

wherein $R_1$ represents an alkyl or aralkyl radical, $R_2$ an alkyl, aryl, aralkyl or a completely hydrogenated hydro-aromatic radical, with 1-(2'.3'-hydroxynaphthoylamino)-2-4-dimethoxy-5-chlorobenzene or with 1-(2'.3'-hydroxynaphthoylamino) 2.5-dimethoxy-4-chlorobenzene, provided that the diazo-components do not contain any solubilizing group such as, for instance, the sulfonic or carboxylic acid group.

The dyestuffs may be produced in known manner in substance, on the fiber or on any of the usual substrata adapted for the production of lakes; when produced on the fiber, they yield vivid shades of very good fastness properties.

The bases of the above formula may, for instance, be prepared by causing 2-nitro-toluene-4-sulfochloride to act upon suitable dialkyl, alkyl-aryl or alkyl-aralkyl amines and subsequently reducing the nitro bodies or by alkylating and reducing 2-nitro-toluene-4-sulfonic acid-mono-alkyl-amides or the corresponding mono-aryl, mono-aralkyl or mono-hydroaromatic amides.

The properties of some of the bases thus obtainable are the following:

2 - amino - toluene - 4-sulfonic acid-diethylamide — colorless crystals melting at 117° C.
2 - amino - toluene - 4-sulfonic acid-N-methyl-benzylamide — colorless crystals melting at 110° C.
2 - amino - toluene - 4-sulfonic acid -N - methyl-cyclohexyl-amide — colorless crystals melting at 112° C.
2 - amino - toluene - 4-sulfonic acid - N-methyl-ortho-chlor-anilide — colorless crystals melting at 114° C.

The dyestuffs of the present invention are distinguished by an essentially better fastness to light than the azo-dyestuffs obtainable according to the statements of U. S. Patent No. 1,678,599 by coupling diazotized 1-amino-6-methyl-benzene-3-sulfonic acid amides with 1-(2'.3'-hydroxynaphthoylamino)-4-chloro-2-methoxybenzene or with 1-(2'.3'-hydroxynaphthoylamino)-5-chloro-2-methoxybenzene.

The following examples serve to illustrate the invention, but they are not intended to limit it thereto:

*Dyeing prescription for Examples 1-7*

50 grams of well-boiled cotton yarn are treated at 35° C. to 40° C. with the grounding liquor for half-an-hour, well freed from water by squeezing or centrifuging and developed for half-an-hour in the dye bath; the dyed yarn is well rinsed, soaped at boiling temperature, rinsed again and dried.

(1) (a) *Grounding liquor*

3 grams of 1-(2'.3'-hydroxynaphthoylamino) 2.4-dimethoxy-5-chlorobenzene are dissolved in
3 cc. of pyridine,
3 cc. of alcohol,
1.5 cc. of caustic soda solution of 34° Bé.,
1.5 cc. of formaldehyde of 30 per cent strength and
3 cc. of water, and after half-an-hour the whole is poured into a mixture of
10 cc. of Turkey red oil 1:2,
10 cc. of caustic soda solution of 34° Bé.,
200 cc. of water of 100° C. and
700 cc. of water of 20° C. The whole is then made up with water to 1000 cc.

(b) *Dye bath*

2.14 grams of 2-amino-toluene-4-sulfonic acid-dimethylamide are diazotized in the usual manner with
3.1 cc. of hydrochloric acid of 20° Bé. and
8 cc. of sodium nitrite solution 1:10. The diazosolution is then rendered neutral to Congo-paper by means of about
72 cc. of sodium acetate solution 1:5,
140 cc. of sodium chloride solution 1:5 are added and the whole is made up with cold water to 1000 cc.

There is obtained a vivid red dyeing of very good fastness to washing, to chlorine, to boiling lye and especially to light. The dyestuff corresponds to the following formula:

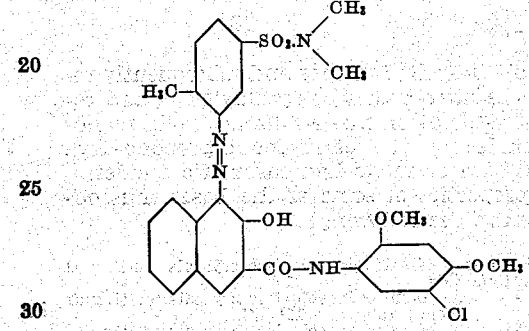

(2) (a) *Grounding liquor*

The grounding liquor is prepared as that described in Example 1.

(b) *Dye bath*

2.42 grams of 2-amino-toluene-4-sulfonic acid-diethylamide are diazotized in the usual manner with
3.1 cc. of hydrochloric acid of 20° Bé. and
8 cc. of sodium nitrite solution 1:10. The diazo solution is then rendered neutral to Congo-paper by means of
72 cc. of sodium acetate solution 1:5,
140 cc. of sodium chloride solution 1:5 are added and the whole is made up with cold water to 1000 cc.

There is obtained a vivid red dyeing of a somewhat more yellowish hue than that of the dyestuff described in Example 1; it has a very good fastness to washing, to chlorine, to boiling lye and to light.

(3) (a) *Grounding liquor*

The grounding liquor is prepared as that described in Example 1.

(b) *Dye bath*

2.9 grams of 2-amino-toluene-4-sulfonic acid-N-methylbenzylamide are diazotized as described in Examples 1 and 2.
There is obtained a vivid red dyeing of very good fastness to washing, to chlorine, to boiling lye and especially to light.

(4) (a) *Grounding liquor*

The grounding liquor is prepared as that described in Example 1.

(b) *Dye bath*

2.82 grams of 2-amino-toluene-4-sulfonic acid-N-methyl-cyclohexylamide are diazotized as described in Examples 1 and 2.
There is obtained a yellowish-red dyeing of good fastness properties.

(5) (a) *Grounding liquor*

The grounding liquor is prepared as that described in Example 1.

(b) *Dye bath*

3.11 grams of 2-amino-toluene-4-sulfonic acid-N-methyl-ortho-chloranilide are diazotized as described in the preceding examples.

(6) (a) *Grounding liquor*

2.7 grams of 1-(2'.3'-hydroxynaphthoylamino)-2.5-dimethoxy-4-chlorobenzene are dissolved in
5.4 cc. of alcohol,
1.35 cc. of formaldehyde solution of 30% strength,
1.3 cc. of caustic soda solution of 34° Bé. and
2.7 cc. of water and after half-an-hour the whole is poured into a mixture of
6 cc. of caustic soda solution of 34° Bé.,
10 cc. of Turkey red oil 1:2,
200 cc. of water of 100° C. and
750 cc. of water of 20° C. The whole is then made up with water to 1000 cc.

(b) *Dye bath*

2.14 grams of 2-amino-toluene-4-sulfonic acid-dimethylamide are diazotized in the usual manner with
3.1 cc. of hydrochloric acid of 20° Bé. and
8 cc. of sodium nitrite solution 1:10. The diazo-solution is then rendered neutral to Congo paper by means of about
72 cc. of sodium acetate solution 1:5,
140 cc. of sodium chloride solution 1:5 are added and the whole is made up with cold water to 1000 cc.

There is obtained a vivid, yellowish-red dyeing of very good fastness to washing, to chlorine, to boiling-lye and especially to light. The dyestuff corresponds to the following formula:

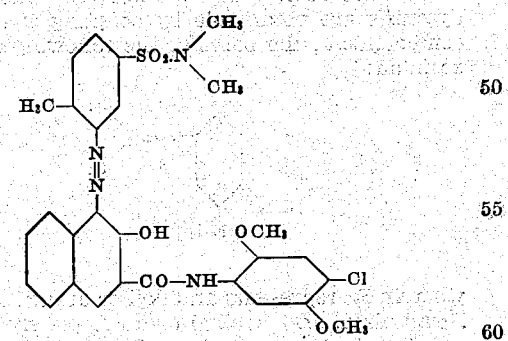

(7) (a) *Grounding liquor*

The grounding liquor is prepared as that described in Example 6.

(b) *Dye bath*

2.9 grams of 2-amino-toluene-4-sulfonic acid-N-methyl-benzylamide are diazotized as described in Example 6.
There is obtained a vivid, yellowish-red dyeing of very good fastness to washing, to chlorine, to boiling lye and especially to light.

(8) 10.7 grams of 2-amino-toluene-4-sulfonic acid-dimethyl-amide are diazotized in the usual manner. Thereupon, the diazo-solution to which sodium acetate has been added in such a quantity as is necessary for binding the excess of hydrochloric acid is introduced, while stirring, into a solution of 17.9 grams of 1-(2'.3'-hydroxynaphthoylamino)-2.4-dimethoxy-5-chlorobenzene in dilute caustic soda solution. The dyestuff which has been precipitated is filtered by suction, well washed and dried. It forms a red powder which dissolves in concentrated sulfuric acid to a red-violet solution. The lakes prepared from the dyestuff in the usual manner are entirely fast to oils and yield red tints which are fast to light.

The coupling may also be effected in the presence of a substratum adapted for the production of lakes. The dyestuffs are especially adapted for dyeing rubber goods, since they are fast to vulcanization.

The following table indicates a number of other azo-dyestuffs obtainable according to the present invention:

|   | Diazo-compound from 2-amino-toluene-4-sulfonic acid | Coupled with | Tint |
|---|---|---|---|
| 1. | Dipropylamide | 1-(2'.3'-hyrdoxy-naphthoyl-amino)-2.4-dimethoxy-5-chlorobenzene. | Vivid yellowish-red. |
| 2. | Dibutylamide | ----do---- | Yellowish-red. |
| 3. | Diamylamide | ----do---- | Do. |
| 4. | Methyl-ethyl-amide | ----do---- | Vivid yellowish-red. |
| 5. | Methyl-ethanol-amide | ----do---- | Do. |
| 6. | Methyl-allyl-amide | ----do---- | Do. |
| 7. | Methyl-propyl-amide | ----do---- | Scarlet red. |
| 8. | Methyl-butyl-amide | ----do---- | Vivid yellowish-red. |
| 9. | Methyl-isobutyl-amide | ----do---- | Do. |
| 10. | Ethyl-benzyl-amide | ----do---- | Do. |
| 11. | Ethyl-ethanol-amide | ----do---- | Do. |
| 12. | N-methyl-anilide | ----do---- | Yellowish-red. |
| 13. | N-ethyl-anilide | ----do---- | Do. |
| 14. | N-butyl-anilide | ----do---- | Do. |
| 15. | N-methyl-ortho-anisidide. | ----do---- | Do. |
| 16. | N-methyl-tetrahydro-alpha-naphthylamide. | ----do---- | Do. |
| 17. | N-methyl-(para-methoxy)-benzylamide. | ----do---- | Vivid yellowish-red. |
| 18. | N-methyl-(ortho-chloro)-benzyl-amide. | ----do---- | Yellowish-red. |
| 19. | N-methyl-(para-chloro)-benzyl-amide. | ----do---- | Do. |
| 20. | Butyl-benzyl-amide | ----do---- | Vivid yellowish-red. |
| 21. | Dibenzyl-amide | ----do---- | Do. |
| 22. | N-cyclohexyl-benzyl-amide. | ----do---- | Yellowish-red. |
| 23. | N-benzyl-anilide | ----do---- | Do. |
| 24. | Diethyl-amide | 1-(2'.3'-hydroxy-naphthoylamino)-2.5-dimethoxy-4-chlorobenzene. | Scarlet. |
| 25. | Dipropyl-amide | ----do---- | Do. |
| 26. | Dibutyl-amide | ----do---- | Do. |
| 27. | Diamyl-amide | ----do---- | Do. |
| 28. | Methyl-allyl-amide | ----do---- | Do. |
| 29. | Methyl-propyl-amide | ----do---- | Do. |
| 30. | Methyl-isobutyl-amide | ----do---- | Do. |
| 31. | N-ethyl-benzyl-amide | ----do---- | Vivid yellowish-red. |
| 32. | N-methyl-anilide | ----do---- | Yellowish-red. |
| 33. | N-methyl-ortho-chloro-anilide. | ----do---- | Do. |
| 34. | N-methyl-(para-methoxy)-benzyl-amide. | ----do---- | Vivid yellowish-red. |
| 35. | N-methyl-(ortho-chloro)-benzyl-amide. | ----do---- | Do. |
| 36. | N-methyl-(para-chloro)-benzyl-amide. | ----do---- | Do. |
| 37. | N-methyl-cyclohexyl-amide. | ----do---- | Scarlet. |
| 38. | Dibenzylamide | ----do---- | Vivid red. |
| 39. | N-cyclohexyl-benzyl-amide. | ----do---- | Yellowish-red. |
| 40. | N-benzyl-anilide | ----do---- | Do. |

Since an object of the present invention is to provide dyestuffs of good fastness properties which dyestuffs are insoluble in water and alkalies, it is to be understood that the aromatic nuclei of the general formulæ appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid groups.

We claim:

1. The water-insoluble mono-azo-dyestuffs of the following general formula:

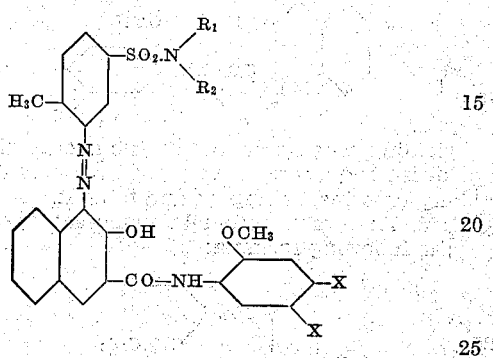

wherein one X stands for chlorine and the other X for methoxy, $R_1$ means an alkyl or aralkyl radical and $R_2$ an alkyl, aryl, aralkyl or a completely hydrogenated hydroaromatic radical, yielding, when produced on the fiber, vivid red dyeings of very good fastness properties, particularly of very good fastness to light.

2. The water-insoluble mono-azo-dyestuffs of the following general formula:

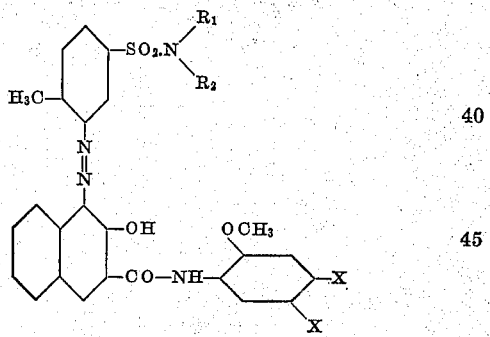

wherein one X stands for chlorine and the other X for methoxy, $R_1$ and $R_2$ mean alkyl or aralkyl radicals, yielding, when produced on the fiber, vivid red dyeings of very good fastness properties, particularly of very good fastness to light.

3. The water-insoluble mono-azo-dyestuffs of the following formula:

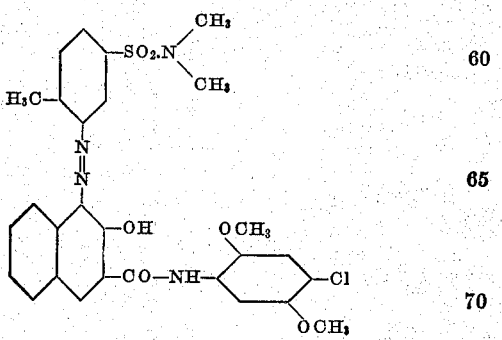

yielding, when produced on the fiber, a vivid yellowish-red dyeing of very good fastness to washing, chlorine, boiling lye and to light.

4. The water-insoluble monoazo-dyestuff of the following formula:

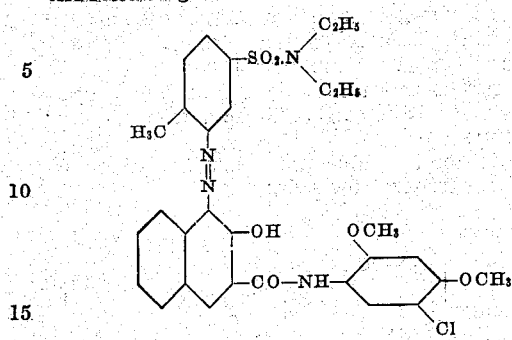

yielding, when produced on the fiber, a vivid yellowish-red dyeing of very good fastness to washing, chlorine, boiling lye and to light.

5. The water-insoluble mono-azo-dyestuff of the following formula:

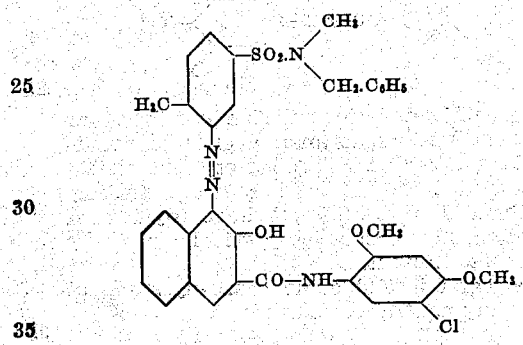

yielding, when produced on the fiber, a vivid red dyeing of very good fastness to washing, to chlorine, to boiling-lye and to light.

6. Fiber dyed with the mono-azo-dyestuffs as claimed in claim 1.
7. Fiber dyed with the mono-azo-dyestuffs as claimed in claim 2.
8. Fiber dyed with the mono-azo-dyestuff as claimed in claim 3.
9. Fiber dyed with the mono-azo-dyestuff as claimed in claim 4.
10. Fiber dyed with the mono-azo-dyestuff as claimed in claim 5.

LEOPOLD LASKA.
ARTHUR ZITSCHER.
ERNST FISCHER.
WILHELM LAMBERZ.